United States Patent Office 3,436,439
Patented Apr. 1, 1969

3,436,439
PREPARATION OF SILOXANE BLOCK COPOLYMERS
Carl M. Woods, Midland, Mich., assignor to Dow Corning Corporation, Midland, Mich., a corporation of Michigan
No Drawing. Filed Aug. 13, 1965, Ser. No. 479,614
Int. Cl. C08g *31/16, 31/32*
U.S. Cl. 260—825                                  31 Claims

ABSTRACT OF THE DISCLOSURE

A method of preparing siloxane block copolymers is described. A polyorganosiloxane of 10 to 1,000 silicon atoms and 1.90 to 2.00 monovalent organic radicals per molecule,

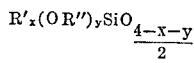

where $x$ is 0.85 to 1.3, $y$ is 0.15 to 3, R' is a monovalent organic radical and R'' is alkyl or hydrogen and ammonia are mixed in an inert organic solvent; the mixture is placed in a closed container and agitated until a siloxane block copolymer is produced; thereafter the volatile compounds are removed. Pourable fluid silixane block copolymers are also described in which the blocks are described as above except $y$ is 0.3 to 1.5. This inexpensive and readily commercializable method produces siloxane block copolymers such as the pourable fluid siloxane block copolymers which can be cured at room temperature to high strength silicone rubber.

This invention relates to a new method for the preparation of siloxane block copolymers.

It is an object of this invention to prepare siloxane block copolymers with improved properties. It is an object of this invention to prepare siloxane block copolymers by an inexpensive method and a readily commercializable method. It is an object of this invention to provide a method for preparing siloxane block copolymers which gives copolymers with reproducible properties. It is an object to provide a method for preparing siloxane block copolymers which will be a pourable fluid which will cure at room temperature to a high strength silicone rubber. Another object is to provide a siloxane block copolymer which is a pourable fluid which will cure at room temperature to a high strength silicone rubber. Other objects will become apparent from the following detailed description of the present invention.

The present invention relates to a method of preparing a siloxane block copolymer comprising:
(I) mixing in an inert organic solvent
 (A) a polyorganosiloxane in an amount of from 50 to 95 mol percent based on the moles of (A) and (B), said polyorganosiloxane having an average of from 10 to 1,000 silicon atoms per molecule, said siloxane consisting essentially of units of the formula

wherein R is a monovalent radical selected from the group consisting of hydrocarbon radicals and halogenohydrocarbon radicals, $n$ has an average value of from 1.90 to 2.00 inclusive, and said siloxane having an average of at least 2 silicon-bonded hydroxyl radicals per molecule,
(B) an organosilicon compound in an amount of from 5 to 50 mol percent, based on the moles of (A) and (B) of the formula

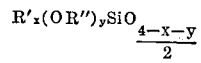

wherein:
R' is a monovalent radical selected from the group consisting of hydrocarbon radicals and halogenohydrocarbon radicals,
R'' is a monovalent radical selected from the group consisting of alkyl radicals and hydrogen atoms,
$x$ has an average value of from 0.85 to 1.3 inclusive,
$y$ has an average value of from 0.15 to 3 and the maximum of $x+y$ is 4,
(C) ammonia, in the form of an aqueous ammonium hydroxide, in an amount of at least 1 weight percent based on the combined weight of the polyorganosiloxane (A) and the organosilicon compound (B),
(II) placing a mixture which is obtained in (I) in a closed container and agitating the mixture at a temperature and for a time sufficient to produce a siloxane block copolymer, and
(III) removing the volatile components from the siloxane block copolymer.

The siloxane block copolymers can readily be prepared by the present method. When the siloxane block copolymers are prepared under similar conditions, the properties of the resulting product are reproducible. Equivalent properties can be obtained by repeating the method using the same parameters. This reproducibility is completely unexpected.

The polyorganosiloxane (A) and the organosilicon compound (B) are mixed with an inert organic solvent. Suitable inert organic solvents are those in which both polyorganosiloxane (A) and organosilicon compound (B) are soluble at the temperature of the reaction. The solvent is "inert" and does not react appreciably with the reactants. Examples of suitable aromatic solvents are xylene, benzene and toluene. Other suitable organic solvents include aliphatic hydrocarbons such as petroleum ether, halogenated hydrocarbons such as chlorobenzene and other organic solvents such as esters and tetrahydrofuran can be used. The reaction product should also be soluble in the solvent used in order to keep the product substantially homogeneous during the reaction and solvent removal step.

The amount of solvent essential for the reaction of the polyorganosiloxane (A) and the organosilicon compound (B) is that amount necessary to prevent gelation and that amount to solubilize the reactants. The concentration of the siloxane reactants is preferably less than 60 weight percent in the solvent. The concentration of the reaction solids is seldom less than 10 weight percent as there is seldom an economic advantage below 10 weight percent solids. The most preferred concentration is from 15 to 50 weight percent solids.

The polyorganosiloxane (A) is essentially a polydiorganosiloxane and is composed of units of the formula

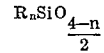

R is a monovalent radical such as a hydrocarbon radical or a halogenohydrocarbon radical. Examples of R as monovalent hydrocarbon radicals are alkyl radicals, such as methyl, ethyl, butyl, isopropyl, hexyl and octadecyl radicals; alkenyl radicals such as vinyl, allyl, methallyl, hexenyl and cyclohexenyl radicals; aryl radicals such as phenyl, tolyl, xylyl, xenyl, and naphthyl radicals; aralkyl radicals such as benzyl and beta-phenylethyl radicals; cycloalkyl radicals such as cyclopentyl and cycohexyl radicals. Examples of R as monovalent halogenohydrocarbon radicals are chloromethyl, bromophenyl, chloropropyl, 3,3,3-trifluoropropyl, chlorophenyl, dichlorophenyl and bromoxenyl radicals. The preferred monovalent radicals are methyl radicals and phenyl radicals. The polyorganosiloxane is essentially a polydiorganosiloxane, thus the value of $n$ is from 1.90 to 2.00 inclusive and it is preferred that $n$ have an average value of from 1.98 to 2.00 inclusive. The polydiorganosiloxane is composed essentially of diorganosiloxane units with limited amounts of monoorganosiloxane units and $SiO_2$ units. It is essential that the polyorganosiloxane (A) have an average of at least two silicon bonded hydroxyl radicals per molecule. It is also essential that the polydiorganosiloxane (A) have an average of at least 10 silicon atoms per molecule and can have an average of up to 1,000 silicon atoms per molecule. It is preferred that polyorganosiloxane (A) have at least 110 silicon atoms per molecule and no more than 600 silicon atoms per molecule.

The organosilicon compound (B) is a hydrocarbonoxy or hydroxy containing organosilicon compound of the formula

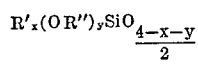

wherein R' is a monovalent radical which is defined above for R. Whereas R is preferably methyl and phenyl with emphasis on methyl, R' is preferably phenyl or some other aryl radical. R'' is a monovalent radical selected from the group consisting of alkyl radicals and hydrogen atoms. The alkyl radicals are preferably alkyl radicals having from 1 to 5 carbon atoms per radical such as methyl, ethyl, propyl, isopropyl, butyl or amyl radicals. The value of $x$ is from 0.85 to 1.3 inclusive such that the organosilicon compound is essentially a monoorgano silicon compound. Preferably, $x$ is from 0.95 to 1.05 inclusive. The organosilicon compound (B) can contain diorganosiloxane units such as $R'_2SiO$ and small amounts of $SiO_2$ units. A critical requirement of the organosilicon compound (B) is that it contain hydrocarbonoxy radicals or hydroxy radicals, preferably alkoxy radicals having from 1 to 5 carbon atoms per radical. The hydrocarbonoxy radicals and/or hydroxy radicals are present such that $y$ has an average value of from 0.15 to 3 inclusive, thus the organosilicon compound can be either a siloxane or a silane. Preferably, $y$ is from 1 to 3 inclusive.

The hydrocarbonoxy siloxane of (B) can be homopolymers, copolymers, mixtures of homopolymers, mixtures of copolymers and mixtures of homopolymers and copolymers such that the limitations as set forth are not exceeded. The silane of (B) can be any hydrocarbonoxy silane or mixture of hydrocarbonoxy silanes. Examples of hydrocarbonoxy silanes are phenyltrimethoxysilane, propyltriethoxysilane, propyltrimethoxysilane, tolyltriamyloxysilane, chlorophenyltrimethoxysilane, cyclohexyltributoxysilane, ethyltrimethoxysilane and vinylmethoxydiethoxysilane.

Mixtures of siloxanes and silanes are also operable such as a phenylsiloxane and phenyltrimethoxysilane; phenylsiloxane and $Si(OC_2H_5)_4$; propylsiloxane and tolyltrimethoxysilane; a methoxylated copolymer of ethylsiloxane and phenylsiloxane and propyltriethoxysilane; and a methoxylated copolymer of vinylsiloxane and propylsiloxane and phenyltriisopropoxysilane. The siloxanes (B) of the present invention can also contain silicon-bonded hydroxyl radicals. Where mixtures of siloxanes and silanes are used, the siloxanes need only contain hydroxyl radicals and the silanes contain the hydrocarbonoxy radicals.

For the purpose of this invention a mole of a silicon containing compound is considered to be equal to one formula weight in grams of the formulae

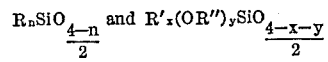

The amount of organosilicon compound (B) is from 5 to 50 mol percent and the amount of polyorganosiloxane (A) is from 5 to 95 mol percent based on the total mols of (A) and (B). Preferably, the organosilicon compound (B) is in amounts from 15 to 50 mol percent based on the total mols of (A) and (B). It is preferred that the amount of (B) is present in such an amount that the number of siloxane units of (B) per block is at least 3.

The mixture of polyorganosiloxane (A) and organosilicon compound (B) are mixed with organic solvent and then mixed with an amount of ammonium hydroxide-water solution (C). The ammonium hydroxide-water solutions which are operable are those solutions which contain from 5 to 40 mol percent ammonia. In determining the amount of (C), it is preferred to define the amount ammonium hydroxide-water solution required in terms of the weight or moles of ammonia based on the combined weight or moles of (A) and (B) as it is a more accurate measure of the solution composition. The amount of ammonia added is at least 1 weight percent based on the weight of (A) and (B). The amount of ammonia added preferably should not exceed 20 weight percent based on the weight of (A) and (B) for economic reasons. Preferably, the solution has from 10 to 35 mol percent ammonia. Ammonium hydroxide-water solutions with less than 5 mol percent ammonia are too slow to be practical and those solutions with from 35 to 40 mol percent ammonia required temperatures below room temperature or elevated pressure. Above 40 mol percent ammonia, the solutions become impractical to handle. The amount of ammonium hydroxide-water solution added depends upon the number of hydrocarbonoxy radicals in organosilicon compound (B). The amount of ammonium hydroxide-water solution added is such that at least 0.01 mole of water is added per mole of hydrocarbonoxy radical. Although no upper limit is critical, there is no change in either reaction rate or product when more than 2.5 moles of water is added per mole of hydrocarbonoxy radical. Preferably, the amount of ammonium hydroxide-water solution added is such that there is from 0.1 to 2.5 moles of water per mole of hydrocarbonoxy radical.

The properties of the final product will depend upon the amount of ammonium hydroxide-water solution added. The final product is a pourable, castable, room temperature curing product when the amount of ammonium hydroxide-water solution added is from 0.01 to 0.5 mole of water per mole of hydrocarbonoxy radical and when $y$ is equal to 3. Pourable room temperature curing products can also be obtained when greater amounts than 0.5 mole of water per mol of hydrocarbonoxy radical is added by reducing the time of agitation to less than 24 hours or 1 day. Pourable products are characterized in that they retain some hydrocarbonoxy radicals on the final product. The final product is a high consistency, rubbery material when the amount of ammonium hydroxide-water solution added is from 0.5 to 2.5 and up moles of water per mole of hydrocarbonoxy radical.

After the polyorganosiloxane (A), the organosilicon compound (B) and the ammonium hydroxide-water solution (C) are mixed, the mixture is placed in a closed container and agitated for a time sufficient to produce a siloxane block copolymer, preferably for from 0.025 to 15 days. Preferably, from 0.025 to 1 day provide fluids products and preferably from 1 to 10 days provide high consistency products. The temperature can very conveniently be room temperature, but temperatures slightly higher or lower can be used as long as a siloxane block copolymer is produced. Temperatures greater than 90° C. should be avoided, preferably the temperature is less than 60° C.

The method of agitation is not critical. Agitation can be accomplished by stirring with a stirrer, placing the closed container on rollers or shaking the closed container. To prepare siloxane block copolymers the following limitations are important: a closed container, agitation and the length of time for the agitation. The length of time required to obtain a siloxane block copolymer will greatly depend upon the reactants and the amount of ammonium hydroxide-water solution added. Shorter times are usually realized with lower hydrocarbonoxy content materials and with higher mol percent ammonia in the ammonium hydroxide-water solution. For optimum results in any specific system, sampling the reaction mixture can be done at various intervals to determine if the reaction is complete or two or three test runs can be conducted.

After the agitation period is complete, the solvent and volatiles are removed. The solvent and other volatiles, such as byproducts, can be removed by any conventional means. Suitable means for removal of volatiles is by heating, by vacuum, by vacuum and by heating or by milling with a heated mill.

Variations in the compositions of the products from the present method can be introduced by adding a benzene soluble resin either initially with the reactants (A), (B) and (C) or after the agitation step (II) but before the solvent removal step (III). The benzene soluble resins which can be added are resin copolymers of $SiO_2$ units and $R'''_3SiO_{0.5}$ units where each $R'''$ is a monovalent radical selected from the group consisting of methyl, ethyl, propyl, vinyl, 3,3,3-trifluoropropyl and phenyl radicals. These soluble resins may contain silicon bonded hydroxyl radicals. The ratio of $R'''_3SiO_{0.5}$ units to $SiO_2$ units is preferably from 0.4/1 to 1.2/1 inclusive. These benzene soluble resin copolymers are well known in the art and can be obtained commercially. A method for preparing these copolymers is found in U.S. Patent No. 2,676,182. The addition of the benzene soluble resin copolymers enhances the tear strength and elongation of the block copolymers. This is particularly true for the pourable compositions obtained when the amount of ammonium hydroxide-water solution added is from 0.01 to 0.5 mole of water per mole of hydrocarbonoxy radical.

The siloxane block copolymers obtained from this method are particularly useful as they require no fillers or other additives to produce strong materials when vulcanized. The vulcanized siloxane block copolymers range from translucent materials when low molecular weight diorganopolysiloxanes are used to opaque materials when high molecular weight polydiorganosiloxanes are used. The block copolymers of this invention are particularly resilient and have excellent fatigue resistant properties when cured. The cured silicone rubbers prepared from these block copolymers have improved tear resistance and abrasion resistance. The siloxane block copolymers of this invention, particularly the pourable fluids, can be used to coat fabric. The coated fabric has excellent abrasion resistance and tear resistance. The siloxane block copolymers of this invention can be added to conventional silicone rubber to improve their tear resistance.

The block copolymers obtained by the present method can contain fillers, such as silicas described in U.S. Patent 2,863,846. Other additives can also be used, such as compression set additives, thermal stabilizers, oxidation inhibitors, plasticizers, pigments and any other material commonly employed in organosilicon rubbers.

The siloxane block copolymers prepared by this method can be cured by heat vulcanization employing conventional organic peroxide catalyst, such as benzoyl peroxide, tertiarybutylperbenzoate, dicumylperoxide, ditert-butylperoxide and bis(2,4-dichlorobenzoyl)peroxide. These materials can be press vulcanized by conventional techniques, such as at a temperature of from 120° C. to 200° C. for 5 to 15 minutes and an aftercure at 150° C. to 250 C. for one to 24 hours. These siloxane block copolymers are particularly unique in that they can also be cured by catalysts for silanol condensation and catalyst for silanol-silicon alkoxy condensation such as amine salts, such as tetramethyl guanidine dioctoate and such as carboxylic acid salts such as dibutyltin dilaurate. Other operative silanol condensation catalysts can be found in copending application U.S. Ser. No. 377,526, filed June 24, 1964. The siloxane block copolymers which are most advantageously cured with catalyst for silanol condensation at room temperature are the pourable siloxane block copolymers.

The pourable fluid siloxane block copolymer can most advantageously be prepared by the following preferred method.

A solution is formed by mixing a suitable organic solvent, a hydroxylated essentially polydiorganosiloxane, a hydrocarbonoxy silane and ammonium hydroxide solution. The hydroxylated essentially polydiorganosiloxane is present in an amount of from 65 to 80 mol percent based on the total moles of the polydiorganosiloxane and the hydrocarbonoxy silane. The polydiorganosiloxane has an average of from 200 to 350 silicon atoms per molecule and consist essentially of units of the formula $$R_nSiO_{\frac{4-n}{2}}$$

where R and n have previously been described. The polydiorganosiloxane contains at least two silicon-bonded hydroxyl radicals per molecule. The hydrocarbonoxysilane is a silane of the formula $R'Si(OR'')_3$, where $R'$ and $R''$ have previously been defined. $R''$ for the preparation of pourable fluid siloxane block copolymers must be such that the $$R'_x(OR'')_ySiO_{\frac{4-x-y}{2}}$$

blocks have a value for $y$ from 0.30 to 1.50 inclusive, in which $R''$ is alkyl and preferably, $y$ is from 0.50 to 1.20 inclusive. The amount of silane is from 20 to 35 mol percent based on the total moles of silane and polydiorganosiloxane present. The ammonium hydroxide-water solution is in an amount such that there is present from 0.25 to 0.4 moles of water per mole of hydrocarbonoxy radical. The aqueous ammonium hydroxide solution and organic solvent have been fully described above. The above ingredients are mixed and placed in a closed container which is agitated for 1 to 24 hours. The temperature is preferably room temperature. The agitation should be such that a thorough mixing results. After the agitation period is complete, the solvent and byproducts are removed by vacuum and heat. The solution is usually agitated during the devolatilization step to enchance the solvent removal.

The siloxane block copolymer product from the above method is a pourable fluid, preferably having a viscosity of from 10,000 to 100,000 cs. at 25° C. The pourable fluid can be cured to silicone rubber at room temperature with silanol condensation catalyst as previously described such as dibutyltin dilaurate. The vulcanized fluids have the unexpected property of high tear resistance. Prior art fluid room temperature curable siloxane rubbers have poor tear resistance.

The fluids cure to a silicone rubber with elongations by about 150 percent. By adding from 15 to 50 parts by weight of the benzene soluble resin previously described per 100 parts by weight of siloxane block copolymer along with the mixture of reactants at the beginning of the preparation, the elongation can be increased to 400 to 500 percent.

The fluids of this invention also have the advantage that the overall cost can be reduced by adding inexpensive fillers such as William's red oxide (an iron oxide). Up to 35 parts by weight red oxide can be added per 100 parts by weight of siloxane block copolymer without degrading the excellent properties of the cured elastomers.

The following examples are illustrative only and should not be construed as limiting the invention which is properly delineated in the appended claims.

EXAMPLE 1

Siloxane block copolymers were prepared by mixing the ingredients of each run in a pint bottle, sealing the bottle and agitating the contents for two days by placing the bottle on rollers:

(A) 69.8 g. of a phenylsiloxane polymer composed of $C_6H_5SiO_{3/2}$ units and having 21.0 weight percent methoxy radicals,
33.3 g. of a hydroxylated essentially polydimethylsiloxane having an average of 116 silicon atoms per molecule,
273.0 g. of purified toluene,
17.55 g. of aqueous ammonium hydroxide containing 29.9 mol percent $NH_3$.
(B) 37.2 g. of the methoxylated phenylsiloxane of (A),
71.0 g. of the hydroxylated polydimethylsiloxane of (A),
306.0 g. of purified toluene,
9.54 g. of the ammonium hydroxide of (A).
(C) 18.6 g. of the methoxylated phenylsiloxane of (A),
35.5 g. of a hydroxylated essentially polydimethylsiloxane containing an average of 11.25 silicon atoms per molecule and having a viscosity of 43.4 cs. at 25° C.
153.0 g. of purified toluene,
4.77 g. of the ammonium hydroxide of (A).
(D) 27.2 g. of the methoxylated phenylsiloxane of (A),
24.1 g. of a hydroxylated essentially polydimethylsiloxane having an average of 34 silicon atoms per molecule,
140 g. of purified toluene,
7.0 g. of the ammonium hydroxide of (A).

After reacting two days, the samples (A) and (B) were devolatilized by milling on a heated two roll mill. Sample (C) was devolatilized to constant weight by heating in an open dish in a 150° C. oven. Sample (D) was partially devolatilized by heating in an open dish in a 150° C. oven and then milled on a heated two roll mill. These block copolymers cured to elastomeric products when catalyzed with tetramethylguanidine dioctoate and press vulcanized.

EXAMPLE 2

A pint bottle was charged with 89.5 g. of a hydroxylated essentially polydimethylsiloxane having an average of 535 silicon atoms per molecule, 10.5 g. of a methoxylated copolymer containing 93.95 mol percent $C_6H_5SiO_{1.5}$ units and 6.05 mol percent $CH_2=CHSiO_{1.5}$ units and having 22 weight percent methoxy radicals, 300 grams of purified toluene and 2.88 g. of the ammonium hydroxide of Example (1)(A). The bottle was sealed and the contents were agitated for 4 days by attaching to a revolving wheel. The siloxane block copolymer solution was washed with water, filtered and devolatilized by milling on a hot two roll mill. The siloxane block copolymer cured to an elastomeric product.

EXAMPLE 3

Siloxane block copolymers were prepared by mixing the ingredients of each run in an 8 ounce jar and placing the closed container on a rotating wheel for 3 days:

(A) 25 g. of a hydroxylated essentially polydimethylsiloxane having an average of 310 silicon atoms per molecule,
25 g. of the phenylsiloxane polymer of Example 1(A).
150 g. of toluene,
11.25 g. of the ammonium hydroxide of Example (1)(A).
(B) 25 g. of the polydimethylsiloxane of (A),
25 g. of the phenylsiloxane polymer of Example 1(A),
150 g. of toluene,
4.5 g. of the ammonium hydroxide of Example (1)(A).
(C) 25 g. of a hydroxylated essentially polydimethylsiloxane having an average of 245 silicon atoms per molecule,
25 g. of the phenylsiloxane polymer of Example 1(A),
150 g. of toluene,
2.25 g. of the ammonium hydroxide of Example 1(A).

After the reaction period, each of the above solutions were washed with water and devolatilized by milling on a hot two roll mill. The block copolymers were cured to translucent elastomeric products. 100 parts by weight of the siloxane block copolymer of (B) was milled with 1 part by weight of tertiarybutyl perbenzoate and press vulcanized for 10 minutes at 150° C. and then cured for 1 hour at 150° C. followed by 4 hours at 250° C. The tensile strength was 1130 p.s.i. and the elongation was 340 percent.

EXAMPLE 4

A one-half gallon jug containing 3 nichrome screens which were cut in strips was charged with 180.5 g. of a hydroxylated essentially polydimethylsiloxane having an average of 255 silicon atoms per molecule, 203.5 g. of a methoxylated monophenylsiloxane polymer containing 21.0 weight percent methoxy groups, 1050 g. of purified toluene, 52.1 g. of aqueous ammonium hydroxide containing 29.3 mol percent ammonia. The resulting mixture was sparged well with ammonia gas at 0° C. The jug was then closed and placed on rollers for 7 days. The resulting siloxane block copolymers was devolatilized on a hot, 2-roll mill. The siloxane block copolymer had good milling characteristics. The siloxane block copolymer was vulcanized by milling 30 g. of the copolymer with 0.30 ml. of tertiary butyl perbenzoate, press molding for 10 minutes at 150° C. and thereafter post curing for 1 hour at 150° C. and 4 hours at 250° C. in an air-circulating oven. The properties of the vulcanized siloxane block copolymer were as follows: durometer 56, tensile strength 995 p.s.i., percent elongation 360, die "B" tear strength 112 p.p.i.

EXAMPLE 5

A siloxane block copolymer was prepared as described in Example 4, except the mixture was not sparged with ammonia gas prior to closing the jug. The siloxane block copolymer was vulcanized by milling 30 g. of the copolymer with 0.3 g. of 2,4-dichlorobenzoyl peroxide. The catalyzed siloxane block copolymer was vulcanized as described in Example 4. The properties of the resulting elastomer were: durometer 66, tensile strength 1,050 p.s.i., percent elongation 245, and die "B" tear strength 87 p.p.i.

EXAMPLE 6

A siloxane block copolymer was prepared by the procedure of Example 5, except the mixture was agitated two days instead of 7 days. The siloxane block copolymer was vulcanized as in Example 4, by milling 30 g. of the copolymer with 0.9 ml. of ethylpolysilicate and 0.3 g. of dicyandiamide. The properties of the resulting elastomer were: durometer 72, tensile strength 1,305 p.s.i., percent elongation 200, and die "B" tear strength 98 p.p.i.

EXAMPLE 7

A one liter, 3-necked flask equipped with a stirrer was charged with 50 g. of a hydroxylated polydimethylsiloxane having an average of 310 silicon atoms per molecule, 367 g. of toluene, 64.2 g. of monophenyltrimethoxysilane and 12.78 g. of aqueous ammonium hydroxide containing 29.3 mol percent ammonia. The flask was closed and the mixture was agitated for one day at room temperature and then 25.56 g. of aqueous ammonium hydroxide was added. This mixture was agitated for two more days at room temperature. The ammonia was removed by reducing the pressure and the remaining volatiles were removed by milling on a hot 2-roll mill. The resulting siloxane block copolymer was a high consistency material with a William's plasticity of 0.105. An elastomer was prepared by press vulcanizing 15.0 g. of the copolymer mixed with 0.153 g. of tertiarybutylperbenzoate for 10 minutes at 150° C. and then post curing for 1 hour at 150° C. and 4 hours at 250° C. The elastomer had a durometer of 40, a tensile strength of 950 p.s.i., and elongation of 465%, a die "B" tear strength of 212 p.p.i. and a strip tear strength of 55 p.p.i.

Strip tear strength as obtained in this invention was determined as follows: The strip tear specimen used was a strip of vulcanized elastomer 3 inches by 0.50 inch by about 0.060 inch. This specimen was split a distance of 1.6 inches down the midline starting at one end to give a trouser shaped specimen with the two trouser legs or tabs being 1.6 inches by 0.25 inch by about 0.060 inch. The tabs were put in a jig which held the ends of the tabs parallel and horizontal and at the same time applying a vertical pull at 20 inches per minute, thereby separating the two tabs and causing a tear to propagate from the end of the 1.6 inch cut in the specimen. The force necessary to propagate a tear was measured in pounds and when divided by the actual thickness at the end of the 1.6 inch split, a measure of tear resistance expressed in pounds per inch, p.p.i., was obtained.

EXAMPLE 8

A one-half gallon jug was charged with 178 g. of monophenyltrimethoxysilane, 155.4 g. of a hydroxylated polydimethylsiloxane having an average of 258 silicon atoms per molecule, 1,000 g. of dried purified toluene, 51.8 g. of methanol, 20.63 g. of aqueous ammonium hydroxide having 30.6 mol percent ammonia. The jug was closed and the contents were agitated by placing on rollers for 24 hours. The mixture was then filtered through a commercial diatomaceous earth filter aid and devolatilized by vacuum. The siloxane block copolymer was a fluid having a viscosity of 34,000 cs. at 25° C. and 1 r.p.m. The copolymer was catalyzed with 0.04 part by weight n-hexylamine and 0.36 part by weight dibutyltin dilaurate and poured into a chase. After curing 11 days at room temperature, the elastomer had a durometer of 53, a tensile strength of 720 p.s.i., an elongation of 185% and a strip tear strength of 40 p.p.i.

EXAMPLE 9

A gallon jug was charged with 446 g. of a hydroxylated polydimethylsiloxane having an average of 288 silicon atoms per molecule, 535 g. of monophenyltrimethoxysilane, 1,860 g. of purified toluene, 62.1 g. of aqueous ammonium hydroxide having 30.4 mol percent ammonia and 155 g. of methanol saturated with 40.5 g. of ammonia. The jug was closed and the contents were agitated on rollers for 1.5 hours at which time 1,033 g. of the mixture was removed, agitation was continued for the remaining mixture in the jug until 6 hours had passed and 1,033 g. of the mixture was removed. The remaining mixture was agitated until 24 hours was reached. Each portion was filtered through a commercial diatomaceous earth filter aid and then devolatilized by vacuum up to 70° C. Each portion provided a fluid siloxane block copolymer which could be cured at room temperature. The viscosities at 25° C. and 1 r.p.m. were as follows:

Reaction time, hours: Viscosity, cs.
1.5 ———————————————————— 72,000
6 ———————————————————— 52,800
24 ———————————————————— 41,600

Each portion was catalyzed with 0.04 part by weight n-hexylamine and 0.36 part by weight dibutyltin dilaurate, poured into a chase and allowed to stand at room temperature for 11 days. The properties of the elastomer were as follows:

| Reaction time, hours | Durometer | Tensile strength, p.s.i. | Percent elongation | Strip tear strength, p.p.i. |
|---|---|---|---|---|
| 1.5 | 40 | 725 | 245 | 32 |
| 6 | 44 | 755 | 300 | 35 |
| 24 | 45 | 730 | 245 | 34 |

EXAMPLE 10

A one-half gallon jar containing Nichrome wire screens was charged with 178.2 g. of monophenyltrimethoxysilane, 155.4 g. of a hydroxylated polydimethylsiloxane having an average of 288 silicon atoms per molecule, 1,000 g. of methylethylketone and 23.9 g. of aqueous ammonium hydroxide having 30.1 mole percent ammonia. The jar was closed and the contents were agitated by placing on rollers for 24 hours. The mixture was then devolatilized by vacuum with heat and agitation after filtering. The siloxane block copolymer was a fluid with a viscosity of 76,800 cs. at 25° C. at 1 r.p.m. The copolymer was catalyzed with 0.04 part by weight of n-hexylamine and 0.36 part by weight dibutyltin dilaurate per 100 parts by weight of copolymer. The catalyzed copolymer was poured into a chase and allowed to cure for 12 days at room temperature. The resulting elastomer had a durometer of 53, a tensile strength of 715 p.s.i., an elongation of 360% and a strip tear strength of 30 p.p.i.

EXAMPLE 11

A pint jar was charged with 51.8 g. of a hydroxylated polydimethylsiloxane having an average of 288 silicon atoms per molecule, 59.4 g. of monophenyltrimethoxysilane, 207 g. of tetrahydrofuran and 68 g. of aqueous ammonium hydroxide having 30.1 mol percent ammonia. The jar was closed and the contents were agitated for 24 hours at room temperature by attaching to a revolving wheel. The fluid siloxane block copolymer produced, had a viscosity of 35,200 cs. at 25° C. and 1 r.p.m. The siloxane block copolymer was catalyzed with 0.04 part by weight of n-hexylamine and 0.36 part by weight of dibutyltin dilaurate per 100 parts by weight of copolymer, poured into a chase and thereafter allowed to cure at room temperature for 30 days. The elastomer had a durometer of 57, a tensile strength of 910 p.s.i., an elongation of 160%, a strip tear strength of 41 p.p.i. and a die "B" tear strength of 148 p.p.i.

EXAMPLE 12

A one-half gallon jug containing Nichrome wire screens was charged with 155.4 g. of a hydroxylated polydimethylsiloxane having an average of 288 silicon atoms per molecule, 178.2 g. of monophenyltrimethyloxysilane, 62.2 g. of a benzene soluble copolymer composed of $(CH_3)_3SiO_{0.5}$ units and $SiO_2$ units, 735 g. of toluene, 20.6 g. of aqueous ammonium hydroxide having 30.6 mol percent ammonia and 52 g. of methanol saturated with 13 g. of ammonia. The jar was closed and the contents were agitated for 24 hours at room temperature by placing on rollers. The siloxane block copolymer was fluid with a viscosity of 28,800 cs. at 25° C. and 1 r.p.m. The copolymer was catalyzed with 0.04 part by weight n-hexylamine and 0.36 part by weight of dibutyltin dilaurate per 100 parts by weight of copolymer. The catalyzed copolymer was poured into a chase and allowed to cure for 90 days at room temperature. The elastomer had a durometer of 57, a tensile strength of 855 p.s.i., an elongation of 490% and a strip tear strength of 34 p.p.i.

EXAMPLE 13

A one-half gallon jug containing Nichrome wire screen strips was charged with 62.2 g. of a benzene soluble copolymer composed of $(CH_3)_3SiO_{0.5}$ units and $SiO_2$ units, 155.4 g. of a hydroxylated polydimethylsiloxane having an average of 288 silicon atoms per molecule, 122.3 g. of monomethyltrimethoxysilane, 632 g. of reagent toluene 20.6 g. of aqueous ammonium hydroxide having 30.6 mol percent ammonia, and 52 g. of methanol. The jug was closed and the contents were agitated for 24 hours at room temperature by placing on rollers. 25 g. of the fluid siloxane block copolymer was catalyzed with 0.025 ml. of n-hexylamine and 0.10 ml. of dibutyltin dilaurate. The catalyzed copolymer was poured into a chase and allowed to cure for 14 days at room temperature. The elastomer had a durometer of 56, a tensile strength of 945 p.s.i. and an elongation of 105%.

EXAMPLE 14

A one-half gallon jug containing Nichrome screen strips was charged with 155.4 g. of a hydroxylated polydimethylsiloxane having an average of 288 silicon atoms per molecule, 216 g. of monophenyltriethoxysilane, 689 g. of reagent toluene, 20.6 g. of aqueous ammonium hydroxide having 30.6 mol percent ammonia and 74.5 g. of ethanol. The jar was closed and the contents were agitated on rollers for 24 hours at room temperature. A fluid siloxane block copolymer was obtained. 25 g. of the copolymer was catalyzed with 0.025 ml. of n-hexylamine and 0.10 ml. of dibutyltin dilaurate, poured into a chase and allowed to cure at room temperature for 21 days. The elastomer had a durometer of 70, a tensile strength of 1,105 p.s.i. and an elongation of 125%.

EXAMPLE 15

A one-half gallon jug containing Nichrome screens was charged with 155.4 g. of hydroxylated polydimethylsiloxane having an average of 288 silicon atoms per molecule, 147.6 g. of monopropyltrimethoxysilane, 80.5 g. of a benzene soluble copolymer composed of $(CH_3)_3SiO_{0.5}$ units and $SiO_2$ units, 660 g. of toluene, 20.5 g. of aqueous ammonium hydroxide having 30.1 mol percent ammonia. The jug was closed and the contents were agitated on rollers for 24 hours at room temperature. The mixture was devolatilized by vaccum with agitation and heating to 50° C. The fluid siloxane block copolymer had a Brookfield viscosity of 3,200 cp. at 25° C. and 10 r.p.m. A 25 g. sample of the copolymer was catalyzed with 0.10 ml. dibutyltin diacetate and 0.025 ml. of n-hexylamine. The catalyzed copolymer was poured into a chase and allowed to cure at room temperature for 42 days. The elastomer had a durometer of 41, a tensile stdength of 770 p.s.i. and an elongation of 200%.

EXAMPLE 16

The siloxane block copolymer of Example 6 was blended with a commercially available polydimethylsiloxane rubber stock containing fillers and peroxide catalyst. The blends were made by milling on a cold 2-roll mill.

| Percent commercial stock | Percent siloxane block copolymer | Strip tear strength, p.p.i. |
|---|---|---|
| 100 | 0 | 62 |
| 94 | 6 | 68 |
| 89 | 11 | 75 |
| 80 | 20 | 87 |

EXAMPLE 17

A pint jar was charged with 55.8 g. of a methoxylated monophenylsiloxane polymer, 49.2 g. of a hydroxylated polydimethylsiloxane polymer having an average of 530 silicon atoms per molecule, 300.8 g. of toluene, 20 g. of acetonitrile, 14.2 g. of aqueous ammonium hydroxide having 34.8 mol percent ammonia. The mixture exclusive of the ammonium hydroxide was sparged with ammonia at 0° C. The jar was closed and the contents were agitated by placing in a gallon can on rollers for 24 hours at room temperature. The mixture was devolatilized by milling on a hot 2-roll mill. The siloxane block copolymer was catalyzed with 1 part by weight of tertiary butyl perbenzoate per 100 parts by weight copolymer. The catalyzed copolymer was press vulcanized for 10 minutes at 150° C. and then post cured for 4 hours at 250° C. The elastomer had a durometer of 39, a tensile strength of 685 p.s.i., an elongation of 300% and a strip tear strength of 31 p.p.i.

A siloxane block copolymer was prepared as described above except that 5.0 g. of the aqueous ammonium hydroxide was used instead of 14.2 g. The siloxane block copolymer which was produced was catalyzed and vulcanized as described above. The elastomer had a durometer of 43, a tensile strength of 1,095 p.s.i., an elongation of 365% and strip tear strength of 31 p.p.i.

EXAMPLE 18

Each of the following compositions were made by mixing the following ingredients in a flask, the flask was closed and the contents were thereafter agitated for 2 days at room temperature.

Composition A 50 g. of a hydroxylated polydimethylsiloxane having an average of 245 silicon atoms per molecule,
50 g. of a methoxylated monophenylsiloxane polymer,
150 g. of toluene,
13.5 g. of aqueous ammonium hydroxide having 29.5 mol percent ammonia.

Composition B

Same as Composition A, except 300 g. of toluene was used in place of 150 g. of toluene.

Composition C

Same as Composition A, except 567 g. of toluene was used in place of 150 g. of toluene.

Each of the siloxane block copolymers were washed twice with water and then devolatilized on a hot 2-roll mill. The siloxane block copolymer of Composition A was opaque and of high consistency with Compositions B and C were translucent and of high consistency.

The siloxane block copolymers were catalyzed and vulcanized as follows:

Composition A 15 g. of copolymer,
0.15 g. of tertiary butyl perbenzoate.

Composition $B_1$ 15 g. of copolymer,
0.15 g. of tertiary butyl perbenzoate and also

Composition $B_2$ 15 g. of copolymer,
0.5 ml. of monomethyltriacetoxysilane,
6 drops of a mixture of 10 parts by volume dibutyltin dilaurate and 1 part by volume n-hexylamine.

Composition C 15 g. of copolymer,
0.5 ml. of monomethyltriacetoxysilane,
6 drops of a mixture of 10 parts by volume dibutyltin dilaurate and 1 part by volume n-hexylamine.

Each catalyzed siloxane block copolymer was press vulcanized for 10 minutes at 150° C. and then post cured for 1 hour at 150° C. and 4 hours at 250° C. The vulcanized elastomers had the following properties:

| Siloxane block copolymer | Durometer | Tensile strength, p.s.i. | Percent elongation |
|---|---|---|---|
| Composition A | 50 | 1,140 | 225 |
| Composition $B_1$ | 55 | 1,300 | 250 |
| Composition $B_2$ | 60 | 1,165 | 190 |
| Composition C | 61 | 1,245 | 160 |
| Composition C* | 58 | 915 | 670 |

*Vulcanized by exposing to room temperature for 7 days.

EXAMPLE 19

When the following ingredients are placed in a closed container and agitated for 10 days at room temperature, a high consistency siloxane block copolymer is obtained. The volatiles are removed by milling the product mixture on a heated mill:

(A) 86.4 g. of an organosiloxane copolymer consisting of 80 mol percent dimethylsiloxane units, 19 mol percent phenylmethylsiloxane units and 1 mol percent of monophenylsiloxane units, the organosiloxane copolymer has an average of 600 silicon atoms per molecule and an average of 8 hydroxyl radicals per molecule, 194 g. of isopropoxylated monotolylsiloxane polymer, having 30.4 weight percent isopropoxy groups, 67.9 g. of aqueous ammonium hydroxide having 35 mol percent ammonia,
1120 g. of purified xylene.
(B) 88.1 g. of an organosiloxane copolymer consisting of 55 mol percent dimethylsiloxane units 30 mol percent ethylmethylsiloxane units, 2 mol percent mono(bromophenyl)siloxane units and 13 mol percent cyclopentylmethylsiloxane units, the organosiloxane copolymer has an average of 1,000 silicon atoms per molecule and an average of 22 hydroxyl radicals per molecule,
177.6 g. of a methoxylated organosiloxane copolymer consisting of 95 mol percent of monobenzylsiloxane units and 5 mol percent of hexylhexenylsiloxane units, having 8.7 weight percent methoxy groups,
19.9 g. of aqueous ammonium hydroxide having 10 mol percent ammonia,
2000 g. of purified toluene,
391 g. of chlorobenzene.
(C) 99.0 g. of an organosiloxane copolymer consisting of 85 mol percent dimethylsiloxane units, 10 mol percent octadecylmethylsiloxane units, 4.5 mol percent methylvinylsiloxane units and 0.5 mol percent monoxenylsiloxane units, the organosiloxane copolymer has an average of 350 silicon atoms per molecule and an average of 3.75 hydroxyl radicals per molecule,
30.2 g. of an amyloxylated organosiloxane copolymer consisting of 95 mol percent monophenylsiloxane units and 5 mol percent $SiO_2$ units, having 15 weight percent amyloxy groups and 1 weight percent hydroxyl radicals,
26.7 g. of aqueous ammonium hydroxide having 5 mol percent ammonia,
194 g. of toluene.

EXAMPLE 20

When 156 g. of a hydroxyl endblocked poly-3,3,3-trifluoropropylmethylsiloxane having an average of 110 silicon atoms per molecule, 218 g. of 3,3,3-trifluoropropyltrimethoxysilane, 35.2 g. of aqueous ammonium hydroxide having 40 mol percent ammonia, 30 g. of methanol, and 872 g. of tetrahydrofuran are placed in a closed container and agitated for one hour at room temperature, a pourable fluid siloxane block copolymer is obtained.

EXAMPLE 21

When the following ingredients are placed in a closed container and agitated for 24 hours at room temperature, a pourable fluid siloxane block copolymer is obtained. The volatiles are removed by heating the agitating mixture under reduced pressure.

(A) 74.3 g. of an organosiloxane copolymer consisting of 99 mol percent dimethylsiloxane units and 1 mol percent monomethallylsiloxane units, having an average of 200 silicon atoms per molecule and an average of 4 hydroxyl radicals per molecule,
148 g. of a butoxylated organosiloxane copolymer consisting of 81.8 mol percent monophenylsiloxane units and 18.2 mol percent diphenylsiloxane units having 6.0 weight percent butoxy groups,
42.1 g. of aqueous ammonium hydroxide having 30 mol percent ammonia,
478 g. of toluene.
(B) 75.4 g. of an organosiloxane copolymer consisting of 98 mol percent dimethylsiloxane units and 2 mol percent monocyclohexenylsiloxane units and having an average of 250 silicon atoms per molecule and an average of 7 hydroxyl radicals per molecule,
113.2 g. of a silane mixture consisting of 95 mol percent monoxylyltrimethoxysilane and 5 mol percent mono(chlorophenyl)trimethoxysilane,
17.6 g. of aqueous ammonium hydroxide having 40 mol percent ammonia,
20 g. of methanol,
754 g. of toluene.
(C) 76.8 g. of an organosiloxane copolymer consisting of 90 mol percent dimethylsiloxane units and 10 mol percent monoallylsiloxane units, having an average of 400 silicon atoms per molecule and having an average of 40 hydroxyl radicals per molecule,
41.9 g. of a methoxylated organosiloxane copolymer consisting of 80 mol percent monophenylsiloxane units, 5 mol percent mono(dichlorophenyl)siloxane units and 15 mol percent $SiO_2$ units, having 25 weight percent methoxy groups,
4.7 g. of aqueous ammonium hydroxide having 25 mol percent ammonia,
10 g. of methanol saturated with 3 g. of ammonia,
356 g. of purified toluene.

EXAMPLE 22

When 78.8 g. of a hydroxyl endblocked diorganosiloxane copolymer consisting of 95 mol percent dimethylsiloxane units and 5 mol percent chlorophenylmethylsiloxane units and having an average of 300 silicon atoms per molecule, 56.0 g. of a methoxylated organosiloxane consisting of 95 mol percent of monophenylsiloxane units and 5 mol percent of methylcyclohexylsiloxane units and having 10 weight percent methoxy groups, 3.6 g. of aqueous ammonium hydroxide having 20 mol percent ammonia, 90 g. of methanol saturated with 26.3 g. of ammonia, 314 g. of toluene are mixed and agitated in a closed container for 36 minutes, at room temperature, a pourable fluid siloxane block copolymer is obtained which can be cured at room temperature.

EXAMPLE 23

When 1,524 g. of a hydroxyl endblocked diorganosiloxane copolymer consisting of 96 mol percent dimethylsiloxane units and 4 mol percent hexylmethylsiloxane units and having an average of 225 silicon atoms per molecule, 1,602 g. of an organosiloxane copolymer composed of 90 mol percent monophenylsiloxane units and 10 mol percent mono-p-bromophenylsiloxane units and having 15 weight percent butoxy groups and 2.1 weight percent hydroxy groups, 0.67 g. of aqueous ammonium hydroxide having 30 mol percent ammonia, 800 g. of n-butanol saturated with 175 g. of ammonia and 9,000 g. of toluene and 474 g. of chlorobenzene are mixed and agitated in a closed container at room temperature for 15 days, a high consistency siloxane block copolymer is obtained which can be cured by peroxide vulcanization after the volatiles are removed by milling on a hot mill.

EXAMPLE 24

When Example 4 is repeated and 67.4 g. of a benzene soluble copolymer consisting of $(CH_3)_3SiO_{0.5}$ units and $SiO_2$ units in a ratio of 0.4:1 is added to the initial mixture of ingredients, a high consistency siloxane block copolymer is obtained which when peroxide vulcanized has improved properties compared to the vulcanized copolymer of Example 4.

EXAMPLE 25

When Example 8 is repeated and 58.7 g. of a benzene soluble copolymer consisting of $(CH_3)_3SiO_{0.5}$ units and $SiO_2$ units in a ratio of 1.2:1 is added to the reacted mixture just prior to the removal of the volatiles, a pourable fluid siloxane block copolymer is obtained which when vulcanized at room temperature has improved properties compared to the vulcanized copolymer of Example 8.

That which is claimed is:
1. A method of preparing a siloxane block copolymer comprising:
(I) mixing in an inert organic solvent
(A) a polyorganosiloxane in an amount of from 50 to 95 mol percent based on the moles of (A) and (B), said polyorganosiloxane having an average of from 10 to 1,000 silicon atoms per molecule, said siloxane consisting essentially of units of the formula $$R_nSiO_{\frac{4-n}{2}}$$

wherein R is a monovalent radical selected from the group consisting of hydrocarbon radicals and halogenohydrocarbon radicals, $n$ has an average value of from 1.90 to 2.00 inclusive, and said siloxane having an average of at least 2 silicon-bonded hydroxyl radicals per molecule, (B) an organosilicon compound in an amount of from 5 to 50 mol percent based on the moles of (A) and (B) of the formula $$R'_x(OR'')_ySiO_{\frac{4-x-y}{2}}$$

wherein R' is a monovalent radical selected from the group consisting of hydrocarbon radicals and halogenohydrocarbon radicals, R'' is a monovalent radical selected from the group consisting of alkyl radicals and hydrogen atoms, $x$ has an average value of from 0.85 to 1.3 inclusive, $y$ has an average value of from 0.15 to 3 inclusive and the maximum of $x+y$ is 4, (C) ammonia, in the form of an aqueous ammonium hydroxide, in an amount of at least 1 weight percent based on the combined weight of the polyorganosiloxane (A) and the organosilicon compound (B), (II) placing a mixture which is obtained in (I) in a closed container and agitating the mixture at a temperature and for a time sufficient to produce a siloxane block copolymer, and (III) removing the volatile components from the siloxane block copolymer.

2. The method in accordance with claim 1, in which $n$ has an average value of from 1.98 to 2.00.

3. The method in accordance with claim 2, in which the polyorganosiloxane has an average of from 110 to 600 silicon atoms per molecule.

4. The method in accordance with claim 3, in which R is a methyl radical.

5. The method in accordance with claim 1, in which $x$ has an average value of from 0.95 to 1.05 inclusive and $y$ has an average value of from 1 to 3 inclusive.

6. The method in accordance with claim 1 in which $y$ is 3.

7. The method in accordance with claim 1 in which R' is an aryl radical and R'' is an alkyl radical.

8. The method in accordance with claim 5 in which R' is an aryl radical and R'' is an alkyl radical having from 1 to 5 inclusive carbon atoms.

9. The method in accordance with claim 6 in which R' is a phenyl radical, R is a methyl radical and R'' is a methyl radical.

10. The method in accordance with claim 3 in which (B) is a monophenylsiloxane polymer having from 15 to 25 weight percent methoxy groups.

11. The method in accordance with claim 1 in which (A) is present in an amount of from 50 to 85 mol percent and (B) is present in an amount of from 15 to 50 mol percent.

12. The method in accordance with claim 9 in which (A) is present in an amount of from 50 to 85 mol percent and (B) is present in an amount of from 15 to 50 mol percent.

13. The method in accordance with claim 1 in which (C) is an aqueous ammonium hydroxide having from 5 to 40 mol percent ammonia based on the moles of ammonia and water and (C) is present in an amount such that there is from 0.01 to 2.5 moles of water per mole of OR'' group.

14. The method in accordance with claim 13 in which the aqueous ammonium hydroxide has from 10 to 35 mol percent ammonia based on the mole of water and ammonia.

15. The method in accordance with claim 14 in which the amount of aqueous ammonium hydroxide present is such that there is from 0.01 to 0.5 moles of water per mole of —OR'' group.

16. The method in accordance with claim 14 in which the amount of aqueous ammonium hydroxide present is such that there is from 0.5 to 2.5 moles of water per mole of —OR'' group.

17. The method in accordance with claim 15 in which the mixture (A), (B) and (C) is agitated in a closed container for from 0.025 to 1 day.

18. The method in accordance with claim 16 in which the mixture (A), (B) and (C) is agitated in a closed container for from 1 to 10 days.

19. The method in accordance with claim 1 in which (III) the volatiles are removed by heat, vacuum and agitation.

20. The method in accordance with claim 1 in which (III) the volatiles are removed by milling on a hot mill.

21. The method in accordance with claim 1 in which a benzene soluble siloxane resin composed of $R'''_3SiO_{0.5}$ units and $SiO_2$ units in which R''' is a monovalent radical selected from the group consisting of methyl, ethyl, propyl, vinyl, 3,3,3-trifluoropropyl and phenyl radicals is mixed with (A), (B) and (C) initially in an amount of up to 50 weight percent based on the weight of (A) and (B).

22. The method in accordance with claim 1 in which a benzene soluble siloxane resin composed of $R'''_3SiO_{0.5}$ units and $SiO_2$ units in which R''' is a monovalent radical selected from the group consisting of methyl, ethyl, propyl, vinyl, 3,3,3-trifluoropropyl and phenyl radicals is added after step (II) and before step (III) in an amount of up to 50 weight percent based on the weight of (A) and (B).

23. The method in accordance with claim 21 in which R''' is a methyl radical and the ratio of $R'''_3SiO_{0.5}$ units to $SiO_2$ units is from 0.4:1 to 1.2:1.

24. The method in accordance which claim 22 in which R''' is a methyl radical and the ratio of $R'''_3SiO_{0.5}$ units to $SiO_2$ units is from 0.4:1 to 1.2:1.

25. A pourable fluid siloxane block copolymer consisting essentially of:

(D) polyorganosiloxane blocks having an average of from 10 to 1,000 silicon atoms per block, the polyorganosiloxane blocks consisting essentially of units of the formula $$R_nSiO_{\frac{4-n}{2}}$$

wherein R is a monovalent radical selected from the group consisting of hydrocarbon radicals and halogenohydrocarbon radicals, $n$ has an average value of from 1.90 to 2.00 inclusive and said blocks being present in an amount of from 50 to 95 mol percent based on the moles of (D) and (E), (E) organosiloxane blocks of an average unit formula $$R'_x(OR'')_ySiO_{\frac{4-x-y}{2}}$$

wherein R' is a monovalent radical selected from the group consisting of hydrocarbon radicals and halogenohydrocarbon radicals, R″ is a monovalent radical selected from the group consisting of alkyl radicals and and hydrogen atoms, at least 0.3 R″ per unit formula being alkyl radicals, $x$ has an average value of from 0.85 to 1.3 inclusive, $y$ has an average value of from 0.3 to 1.50 inclusive, and said blocks being present in an amount of from 5 to 50 mol percent based on the moles of (D) and (E).

26. The pourable fluid siloxane block copolymer of claim 25 in which $n$ has an average value from 1.98 to 2.00 inclusive.

27. A vulcanized pourable fluid siloxane block copolymer in accordance with claim 25 in which the strip tear strength is at least 30 p.p.i.

28. The pourable fluid siloxane block copolymer of claim 26 in which the polyorganosiloxane blocks (D) have an average of 200 to 350 silicon atoms per block, $x$ has an average value of from 0.95 to 1.05 inclusive, $y$ has an average value from 0.50 to 1.20 inclusive, (D) is present in an amount from 65 to 80 mol percent and (E) is present in an amount from 20 to 35 mol percent.

29. The pourable fluid siloxane block copolymer of claim 26 in which the viscosity is from 10,000 to 100,000 cs. at 25° C.

30. A method of preparing a pourable fluid siloxane block copolymer comprising:

(I) mixing in an inert organic solvent
  (A) a polyorganosiloxane in an amount of from 65 to 80 mol percent based on the total moles of (A) and (B), said siloxane having an average of from 200 to 350 silicon atoms per molecule and consisting of units of the formula $$R_n SiO_{\frac{4-n}{2}}$$

in which R is a monovalent radical selected from the group consisting of hydrocarbon radicals and halogeno-hydrocarbon radicals, $n$ has an average value of from 1.98 to 2.00 inclusive, and said siloxane contains at least two silicon-bonded hydroxyl radicals per molecule, (B) a hydrocarbonoxysilane of the formula $$R'Si(OR'')_3$$

in which R′ is a monovalent radical selected from the group consisting of hydrocarbon radicals and halogeno-hydrocarbon radicals and R″ is an alkyl radical, said silane being present in an amount of from 20 to 35 mol percent based on the total moles of (A) and (B), (C) aqueous ammonium hydroxide in an amount such that there is present from 0.25 to 0.4 moles of water per mole of OR″ group, and said ammonium hydroxide having from 10 to 35 mol percent ammonia based on the moles of ammonia and water, (II) placing a mixture which is obtained in (I) in a closed container and agitating the mixture for from 1 to 24 hours at room temperature, and (III) removing the volatile components from the siloxane block copolymer.

31. The method in accordance with claim 29 in which R is a methyl radical, R′ is a phenyl radical and R″ is a methyl radical.

References Cited

UNITED STATES PATENTS

| | | | |
|---|---|---|---|
| 2,979,479 | 4/1961 | Modic | 260—825 |
| 3,308,203 | 3/1967 | Metevia et al. | 260—825 |

SAMUEL H. BLECH, *Primary Examiner.*

U.S. Cl. X.R.

260—33.6, 33.8, 30.4, 37, 18, 32.8; 117—161